Oct. 9, 1923.
L. D. SHILLING
1,470,546
BLOW-OUT BOOT FOR PNEUMATIC TIRES
Filed Oct. 23, 1922
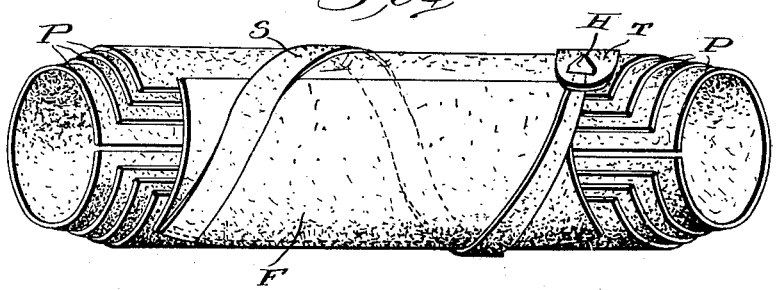
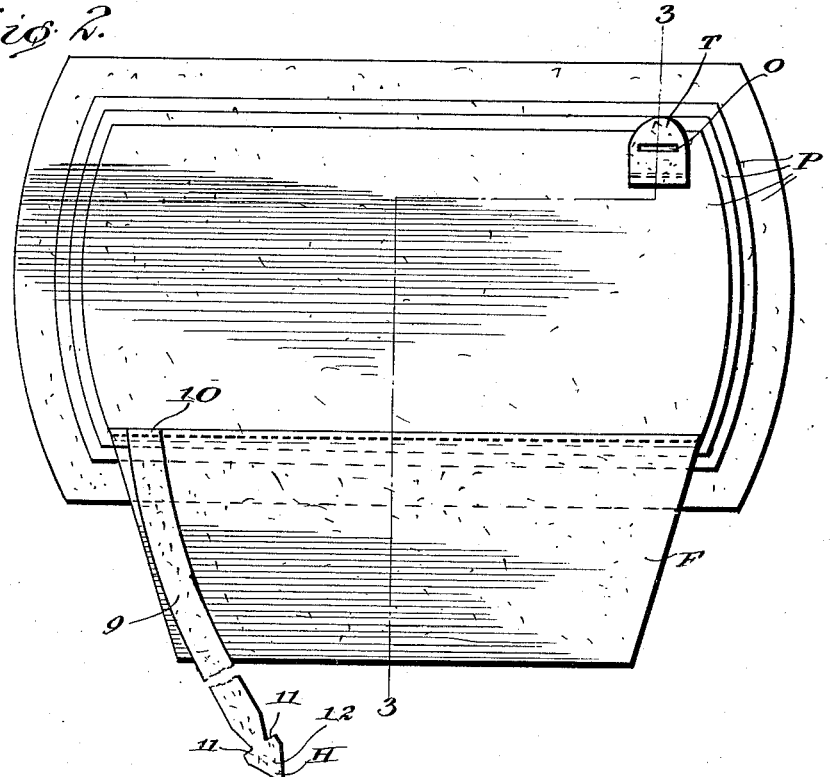
WITNESSES
INVENTOR
Lorenzo D. Shilling
BY
ATTORNEYS Patented Oct. 9, 1923.

1,470,546

UNITED STATES PATENT OFFICE.

LORENZO DOWE SHILLING, OF KALISPELL, MONTANA.

BLOW-OUT BOOT FOR PNEUMATIC TIRES.

Application filed October 23, 1922. Serial No. 596,326.

*To all whom it may concern:*

Be it known that I, LORENZO D. SHILLING, a citizen of the United States, and a resident of Kalispell, in the county of Flathead and State of Montana, have invented certain new and useful Improvements in Blow-Out Boots for Pneumatic Tires, of which the following is a specification.

This invention relates to "blow-out" boots for pneumatic tires.

Among the objects of the invention is to provide a "blow-out boot" which is adapted to be quickly and easily applied to the inner tube of a pneumatic tire; which is adapted to remain in position upon the tire after the same is inflated; which is adapted to be removed from the inner tube of a pneumatic tire without damaging either tube or casing; and which is adapted to be applied or used upon an inner tube and tire as often as necessary.

Other objects relating to the structural features of the invention will hereinafter appear.

The invention is illustrated by way of example in the accompanying drawings, in which:—

Figure 1 is a perspective view of a boot embodying the present invention.

Figure 2 is a plan view of the inner side of the boot.

Figure 3 is a sectional view taken substantially on the lines 3—3 of Figure 2.

Referring to the drawings more particularly, the "boot" may consist in a plurality of plies P which are arranged one upon the other, and the inner ply being of the greatest dimensions. The plies may be made of any suitable material, such as canvas or vulcanized fiber and sewed together.

To the outermost ply P there is attached a wing or flap F, said flap being preferably of the shape shown and having one of its longitudinal edges stitched or sewed to the outer ply P along one of its longitudinal edges. To the other longitudinal edge of the last named ply and adjacent one end thereof there is secured a tang T having a transverse opening or slot O which is adapted to receive a head H formed upon the one end of a strap S, said strap having its other end sewed to the flap F at one corner thereof as indicated at 10. The head H may be formed by the notches 11 in the strap S and preferably the end of the head is pointed as at 12 so that the same may be easily extended through the slot O in the tang T.

The present device as well known is employed for making emergency repairs to pneumatic tires at a point where the tire casing has become weakened due to wear, stone bruise, rim cut, puncture or blow-out hole. When it is desired to reinforce a tire casing at a certain point the inner tube is taken out and the boot is placed upon the inner tube. The flap F is extended between the ends of the plies P, and said flap should have its free end overlapping the associated end of the outermost ply P. The strap S is then wrapped about the boot, as illustrated in Figure 1, and its end connected with a tab T. The inner tube may now be placed in the tire casing and the same inflated. By providing the flap and the strap S the boot, as is obvious, is held against movement upon the inner tube after the same is inflated. Also this arrangement as is apparent prevents pinching of the inner tube by the casing. Furthermore by this particular construction, a boot of one size may be used in either a fabric or cord tire or casing the same size the boot is intended, or any tire or casing not more than thirty per cent oversize. The strap S and also the flap F are adapted to permit the necessary expansion of the boot to fit any casing or tire the same size of the boot. When the boot is in position it is adapted to reinforce the tire or casing at its weak point and thus enable the tire or casing to be used a considerable period without further repair.

I claim:

1. A protector or boot of the character described, comprising a patch, adapted to be positioned about the inner tube of a pneumatic tire, an extension sewed upon the outer surface of one of the ends of said patch and adapted to form a closure between the ends thereof when said patch is in position, and a strap having its one end attached to one end of the patch and adapted to be wrapped about said patch and secured thereto for holding the same upon the inner tube.

2. A protector or boot of the character described, comprising a patch, adapted to be positioned about the inner tube of a pneumatic tire, an extension sewed upon the outer surface of one of the ends of said patch and adapted to form a closure between the ends thereof when said patch is in position, and a strap having its one end secured to one end of the patch adjacent a corner thereof and adapted to be wrapped spirally about the patch and secured at its other end whereby to hold the patch against movement upon the inner tube to which the same is applied.

3. A protector or boot of the character described, comprising a patch, and a strap having its one end secured to an end of said patch and adapted to be wrapped about said patch for holding the same in a circular formation, and means carried by the patch, whereby the free end of said strap may be secured.

LORENZO DOWE SHILLING.